United States Patent
Tanaka

(10) Patent No.: US 10,908,861 B2
(45) Date of Patent: Feb. 2, 2021

(54) INFORMATION PROCESSING METHOD WHICH REGISTERS FOR A WEB SERVICE VIA AN INTERMEDIARY, IMAGE PROCESSING APPARATUS, AND INFORMATION PROCESSING SYSTEM

(71) Applicant: CANON KABUSHIKI KAISHA, Tokyo (JP)

(72) Inventor: Yuya Tanaka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/536,780

(22) Filed: Aug. 9, 2019

(65) Prior Publication Data

US 2020/0073608 A1 Mar. 5, 2020

(30) Foreign Application Priority Data

Aug. 31, 2018 (JP) .................. 2018-163648

(51) Int. Cl.
*G06F 3/12* (2006.01)

(52) U.S. Cl.
CPC .......... *G06F 3/1272* (2013.01); *G06F 3/1204* (2013.01); *G06F 3/1231* (2013.01); *G06F 3/1293* (2013.01)

(58) Field of Classification Search
CPC .... H04N 2201/0034; H04N 2201/0049; G06F 3/1284; G06F 3/1288; G06F 3/1224; G06F 3/1235; G06F 3/1231
See application file for complete search history.

(56) References Cited

U.S. PATENT DOCUMENTS

| 2015/0036191 | A1* | 2/2015 | Suzuki | G06F 3/1253 |
| | | | | 358/1.15 |
| 2017/0063646 | A1* | 3/2017 | Kawai | G06Q 10/10 |
| 2017/0249641 | A1 | 8/2017 | Ohara | G06Q 30/012 |
| 2018/0275938 | A1* | 9/2018 | Nagasaki | H04N 1/4413 |

FOREIGN PATENT DOCUMENTS

JP 2017-156848 9/2017

* cited by examiner

*Primary Examiner* — Kent Yip
(74) *Attorney, Agent, or Firm* — Venable LLP

(57) ABSTRACT

An information processing method including: obtaining first identification information from an image processing apparatus through communication by use of a first communication unit, which is configured to communicate with the image processing apparatus without a network, the first identification information identifying the image processing apparatus; obtaining second identification information transmitted from a management server, which is configured to manage status information transmitted from the image processing apparatus through the network, in response to transmission of the first identification to the management server through the network, the second identification information identifying the image processing apparatus; and transmitting a request, to a server that provides a web service, for performing registration regarding the image processing apparatus based on the second identification information.

22 Claims, 14 Drawing Sheets

| PRINTER ID | SERVICE IDENTIFIER | NOTIFICATION INFORMATION | PRINTER INFORMATION NOTIFICATION DESTINATION URL |
|---|---|---|---|
| 12345ABCDEFG | S0001 | CONSUMABLES INFORMATION | https://aaa.com/api/ink |
| | | | |
| | | | |

FIG.9

| PRINTER ID | SERVICE IDENTIFIER | NOTIFICATION INFORMATION | PRINTER INFORMATION NOTIFICATION DESTINATION URL |
|---|---|---|---|
| 12345ABCDEFG | S0001 | CONSUMABLES INFORMATION | https://aaa.com/api/ink |
| 12345ABCDEFG | S0002 | PRINT INFORMATION | https://bbb.com/api/log |
| | | | |

INFORMATION PROCESSING METHOD WHICH REGISTERS FOR A WEB SERVICE VIA AN INTERMEDIARY, IMAGE PROCESSING APPARATUS, AND INFORMATION PROCESSING SYSTEM

BACKGROUND OF THE INVENTION

Field of the Invention

The present invention relates to a technique for registering an image processing apparatus for a web service.

Description of the Related Art

As a web service utilizing the Internet, there has been a consumables automatic ordering system in which an image processing apparatus notifies a web server of the remaining amounts of consumables such as ink and sheets and the web server automatically orders consumables from a store based on the remaining amount information of the consumables. In Japanese Patent Laid-Open No. 2017-156848 (hereinafter referred to as Document 1), a method of using an image processing apparatus for registration for such a web service as above is suggested.

However, in the technique of Document 1, it is not possible to register for a web service unless the image processing apparatus is connected to the Internet.

SUMMARY OF THE INVENTION

The information processing method according an embodiment of the present invention is an information processing method executed by an information processing apparatus which communicates with a management server and an image processing apparatus, the management server being configured to manage status information transmitted from the image processing apparatus through a network, the information processing apparatus including a first communication unit configured to communicate with the image processing apparatus without the network, the information processing apparatus being configured to perform registration for a web service, the information processing method including: obtaining first identification information from the image processing apparatus through communication by use of the first communication unit, the first identification information identifying the image processing apparatus; obtaining second identification information transmitted from the management server in response to transmission of the first identification information to the management server through the network, the second identification information identifying the image processing apparatus; and transmitting a request, to a server that provides the web service, for performing registration regarding the image processing apparatus based on the second identification information.

Further features of the present invention will become apparent from the following description of exemplary embodiments with reference to the attached drawings.

Figure 7A:
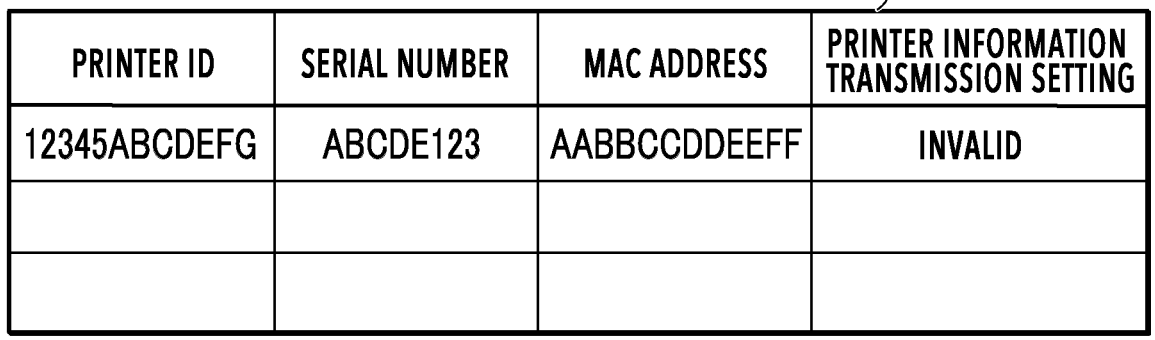
Figure 7B:
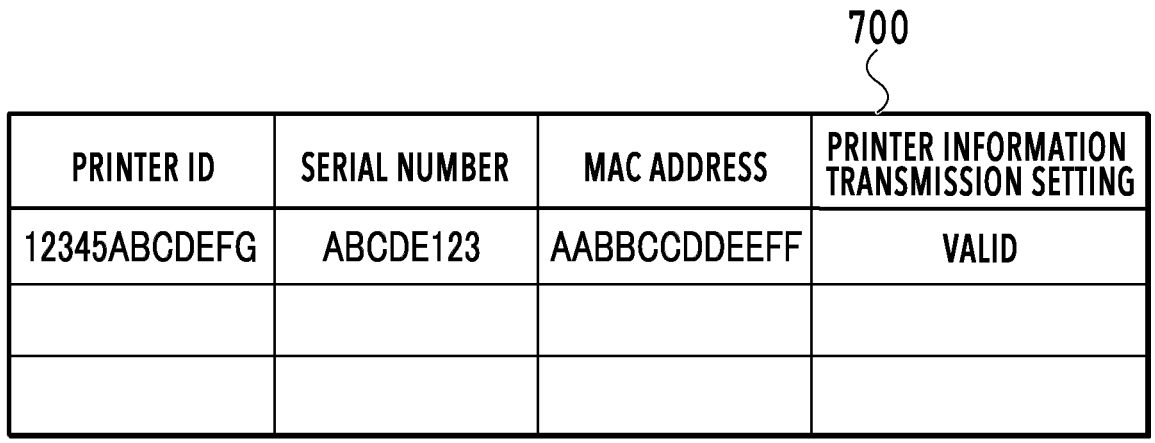
Figure 8:
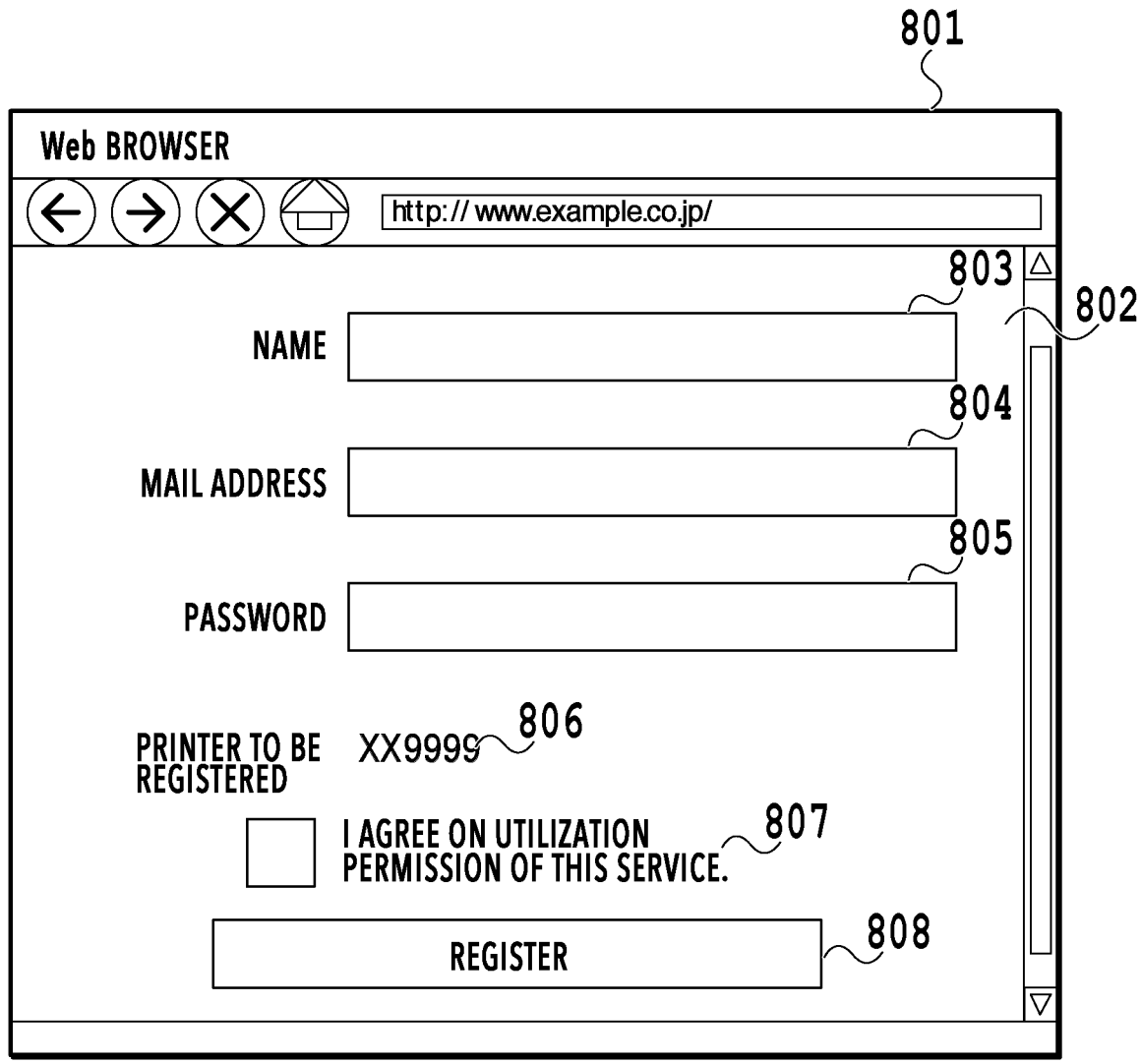
Figure 10:
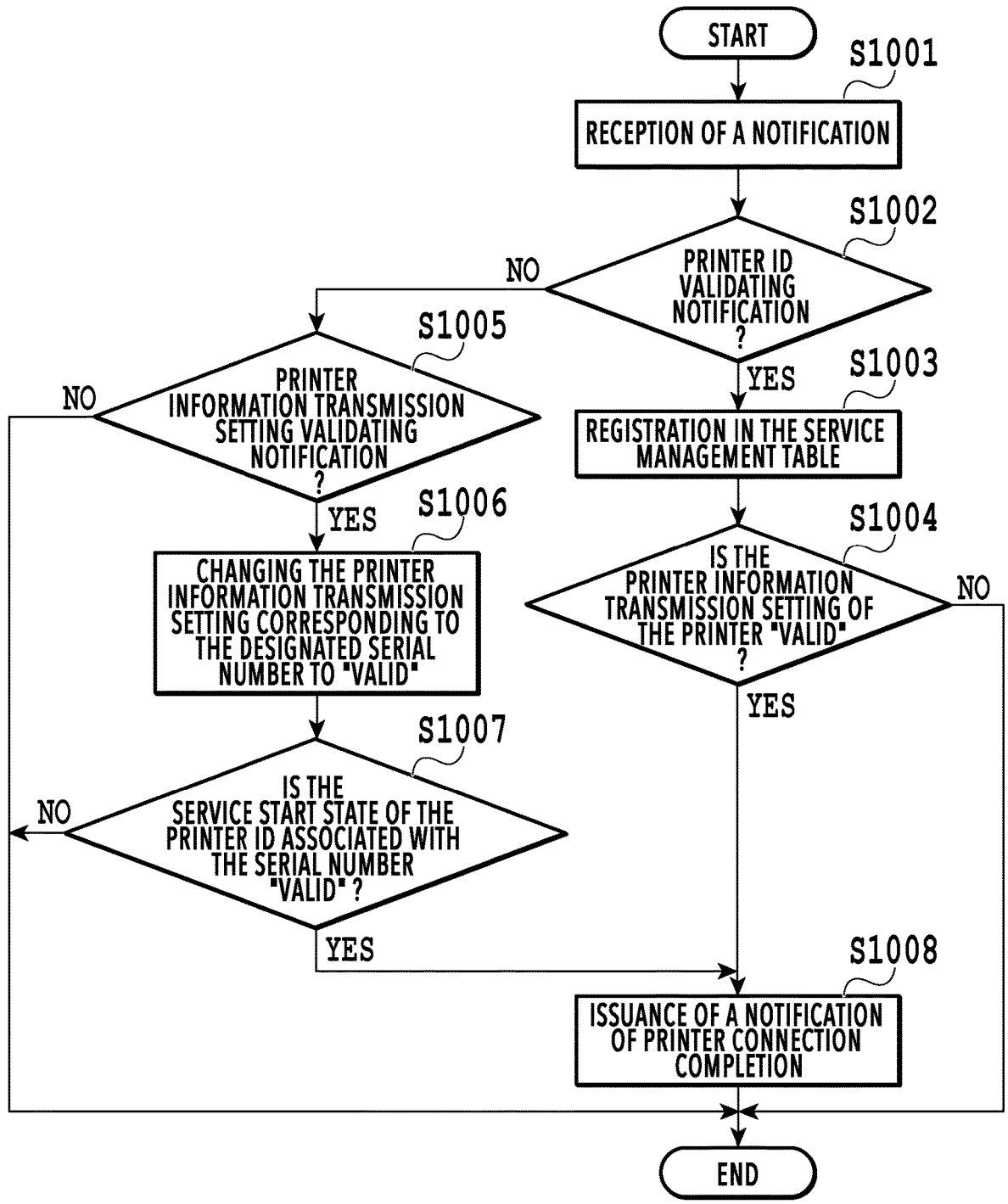
Figure 11:
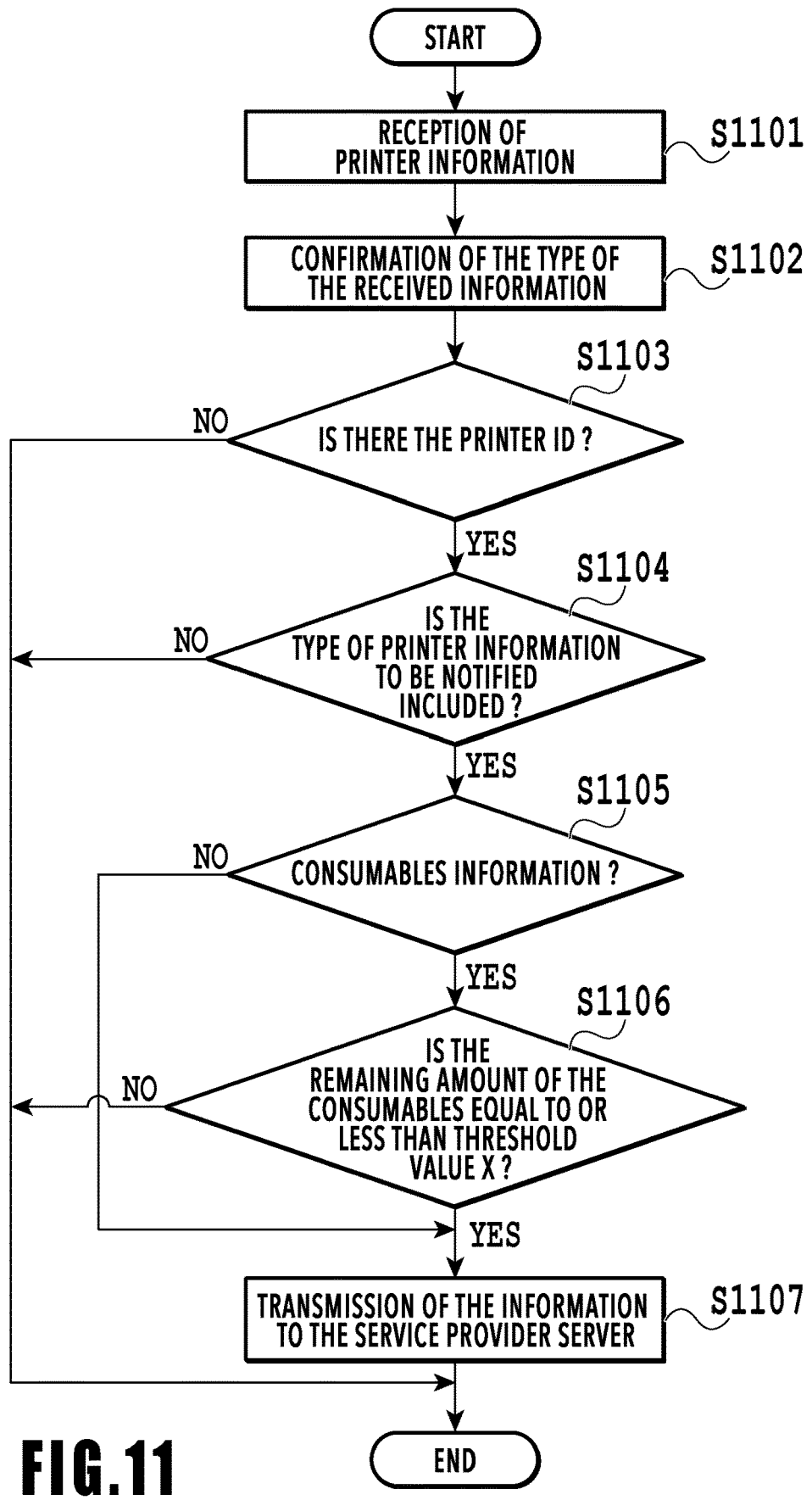
Figure 12:
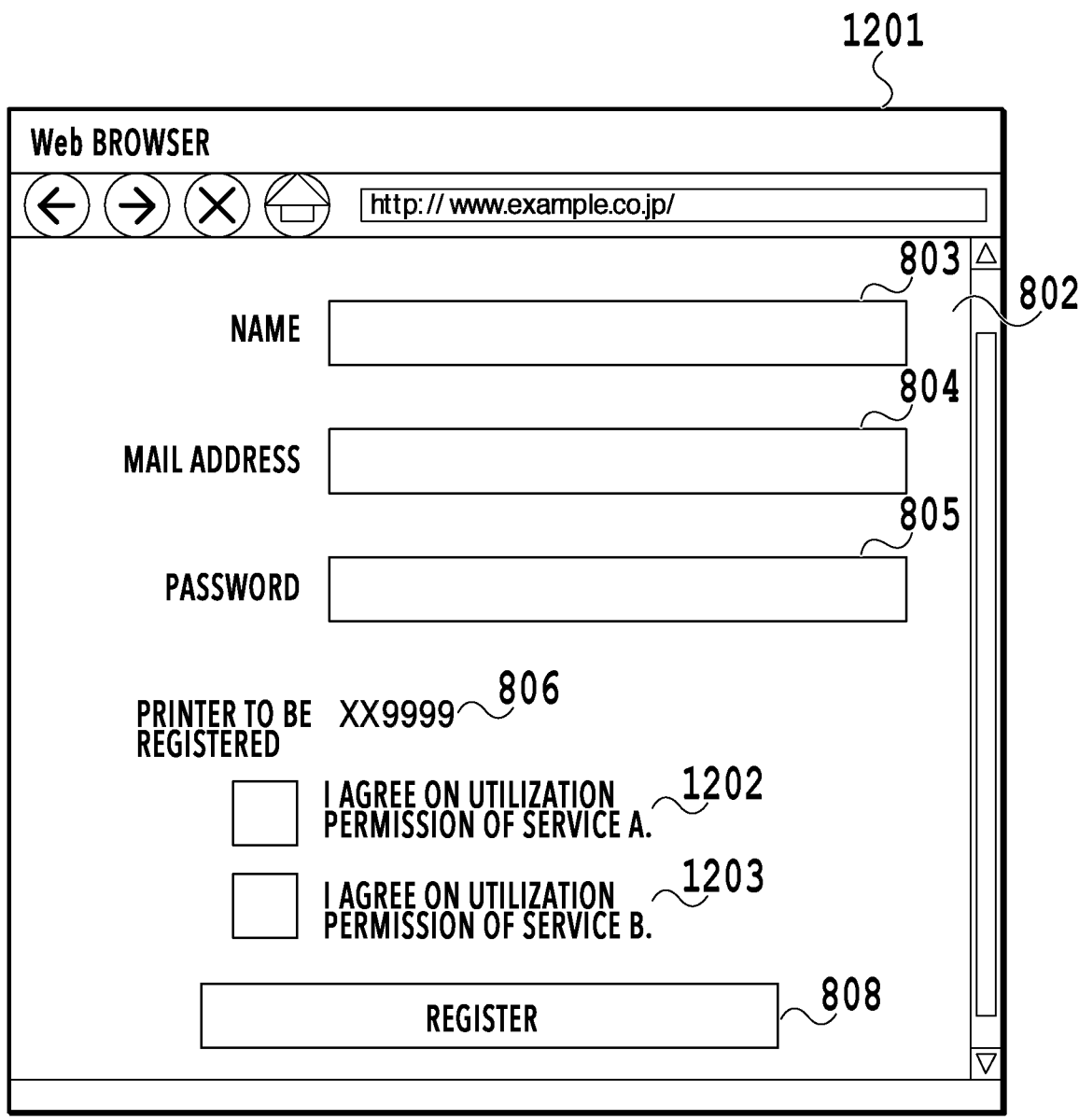
Figure 13:
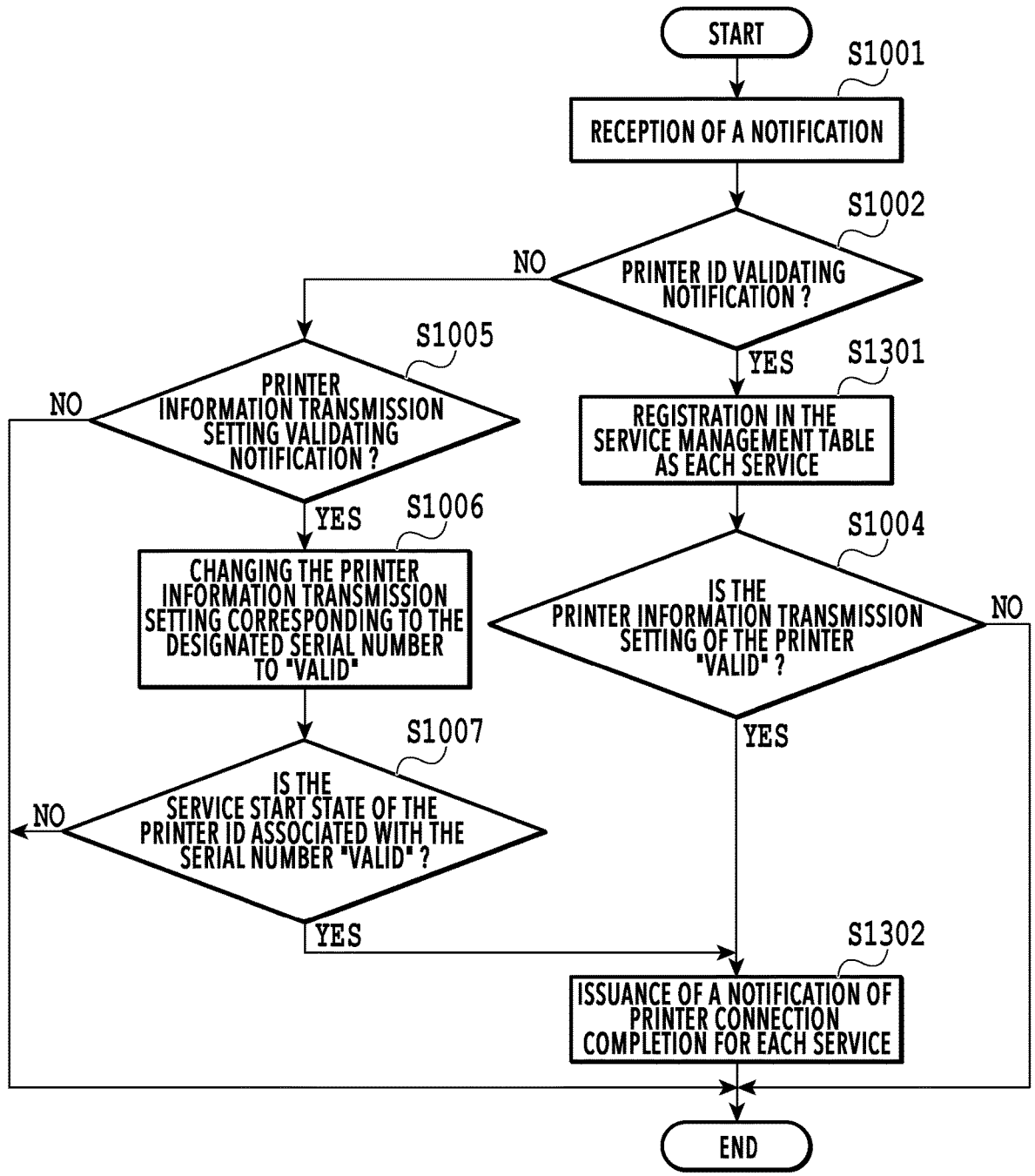

Each of FIGS. 7A and 7B is a printer management table included in a database of a management server;

FIG. 8 is a schematic diagram of a registration page of a web service;

FIG. 9 is a service management table included in the database of the management server;

FIG. 10 is a flowchart related to the service registration processing by the management server;

FIG. 11 is a flowchart related to transmission of printer information by the management server;

FIG. 12 is a schematic diagram of a registration page of a web service;

FIG. 13 is a flowchart related to multiple service registration processing by the management server; and FIG. 14 is a service management table included in the database of the management server.

DESCRIPTION OF THE EMBODIMENTS

Hereinafter, a detail explanation is given of embodiments of the present invention with reference to the attached drawings. It should be noted that the following embodiments do not limit the present invention according to the claims and that every combination of the characteristics explained in the present embodiments is not essential to the solution means of the present invention.

First Embodiment

<System Configuration>

Figure 1:
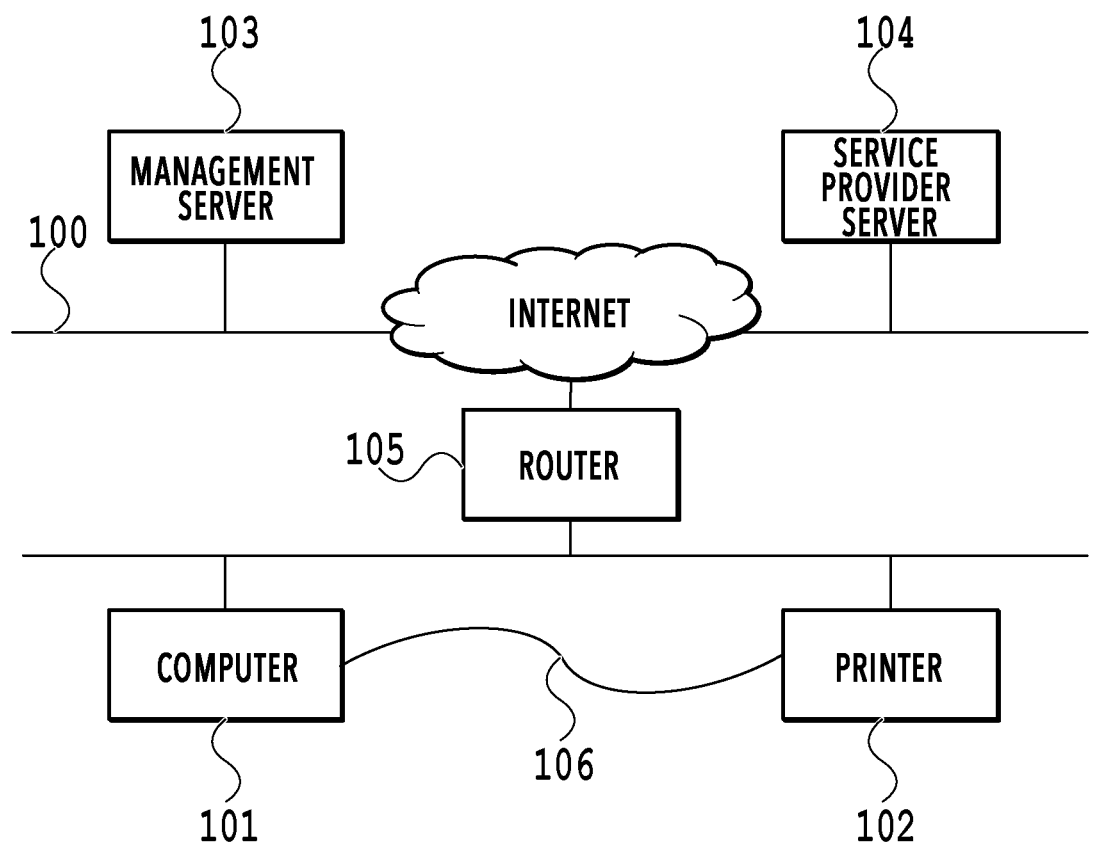
FIG. 1 is a diagram illustrating an example of a system configuration.

FIG. 1 is a diagram illustrating an example of a system configuration of the present embodiment. The information processing system of the present embodiment includes: a computer 101, which is an information processing apparatus; a printer 102, which is an image processing apparatus; a management server 103, and a service provider server 104.

The computer 101 and the printer 102 are capable of being connected to the Internet via a router 105. Each of the management server 103 and the service provider server 104 is connected to the Internet 100. Furthermore, the printer 102 is capable of mutually communicating with the computer 101 through a USB cable 106. That is, the printer 102 is capable of being connected to the Internet via the router 105 and also capable of being connected directly to the computer 101 without using a network. Note that the printer 102 is also capable of being connected to the computer 101 via a network such as a LAN provided by the router 105. Although USB is taken as an example of the interface for directly connecting the computer 101 and the printer 102 in the explanation of the present embodiment, the interface may be Wi-Fi Direct, Bluetooth Low Energy, etc.

The management server 103 manages information transmitted from the printer 102 and is capable of providing the information transmitted from the printer 102 to the service provider server 104 via the Internet 100. For each communication, control through HTTP, XMPP, etc., is performed. Note that, as for the protocol, another protocol may be used.

<Hardware Configuration of Computer>

Figure 2:
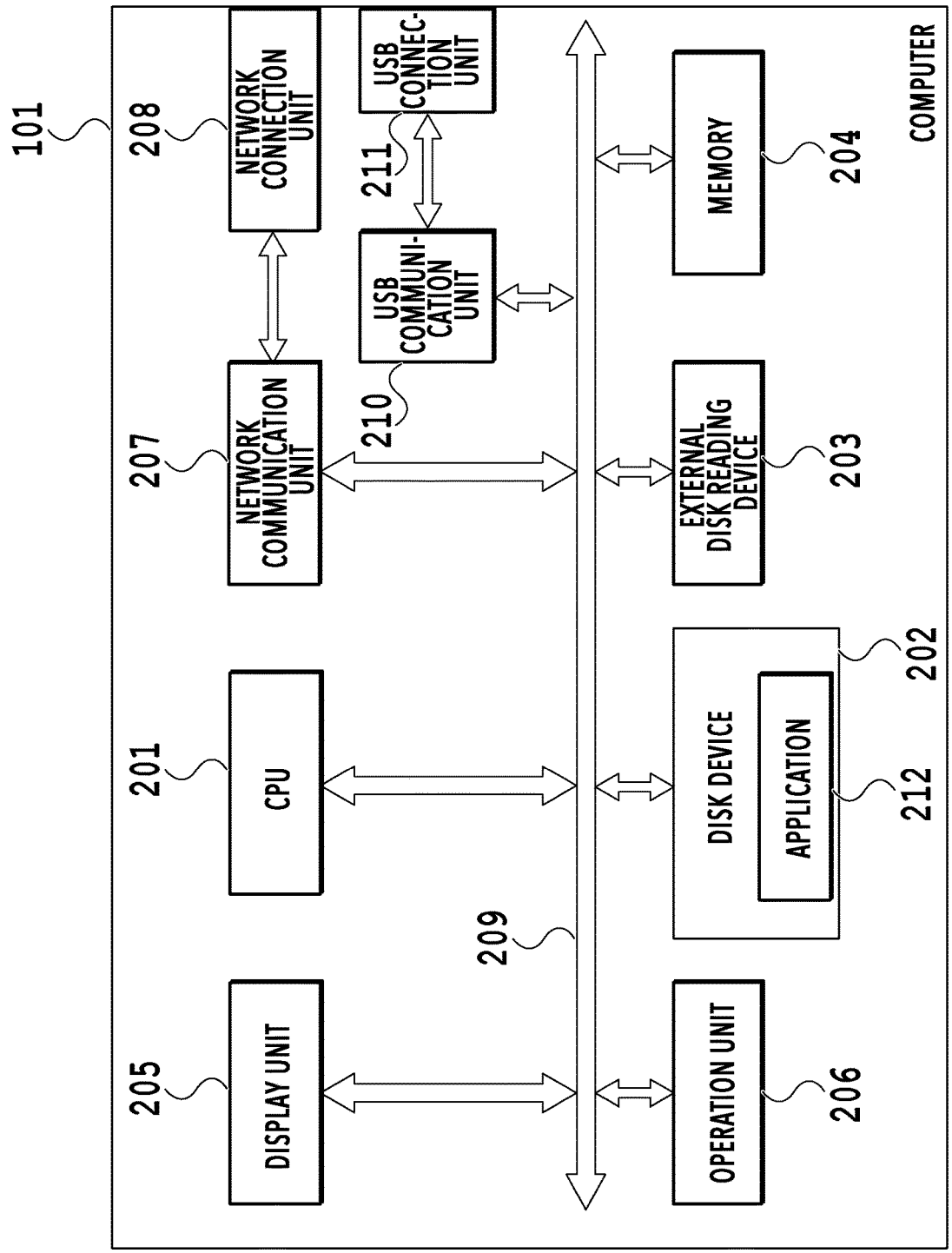
FIG. 2 is a block diagram illustrating an example of a hardware configuration of a computer.

FIG. 2 is a diagram illustrating an example of the hardware configuration of the computer 101. The computer 101 includes a CPU 201, a disk device 202, an external disk reading device 203, a memory 204, a display unit 205, and an operation unit 206. Further, the computer 101 includes a network communication unit 207, a network connection unit 208, a USB communication unit 210, and a USB connection unit 211.

The CPU 201 is a central processing unit for controlling each unit of the computer 101. The disk device 202 stores various kinds of files as well as an OS and an application 212 to be read out by the CPU 201. The external disk reading device 203 is a device for reading out data such as a file stored in an external storage medium such as an SD card. The memory 204 is configured with a RAM or the like, which is used by the CPU 201 for temporary storage of data, buffering of data, etc., as needed. The display unit 205 is configured with an LCD, for example, and displays various kinds of information. The operation unit 206 includes a keyboard, a mouse, and the like, for a user to perform various kinds of input operations. The network communication unit 207 is connected to the router 105 via the network connection unit 208. That is, the network communication unit 207 is connected to a network such as the Internet 100 via the network connection unit 208 and performs various kinds of communications. The network communication unit 207 corresponds to a wired LAN or a wireless LAN. In a case where the network communication unit 207 corresponds to a wired LAN, the network connection unit 208 is a connector for connecting a cable of a wired LAN, and, in a case where the network communication unit 207 corresponds to a wireless LAN, the network connection unit 208 is an antenna. The USB communication unit 210 is connected to various peripheral apparatuses (e.g., the printer 102) via the USB connection unit 211 and performs various kinds of communications. The above-described units are mutually connected via a bus 209. Note that, although the computer 101 is taken as an example of the information processing apparatus in the explanation of the present embodiment, the present invention is not limited thereto. For example, an information processing terminal such as a smartphone or a tablet may be used as the information processing apparatus.

<Hardware Configuration of Printer>

Figure 3:
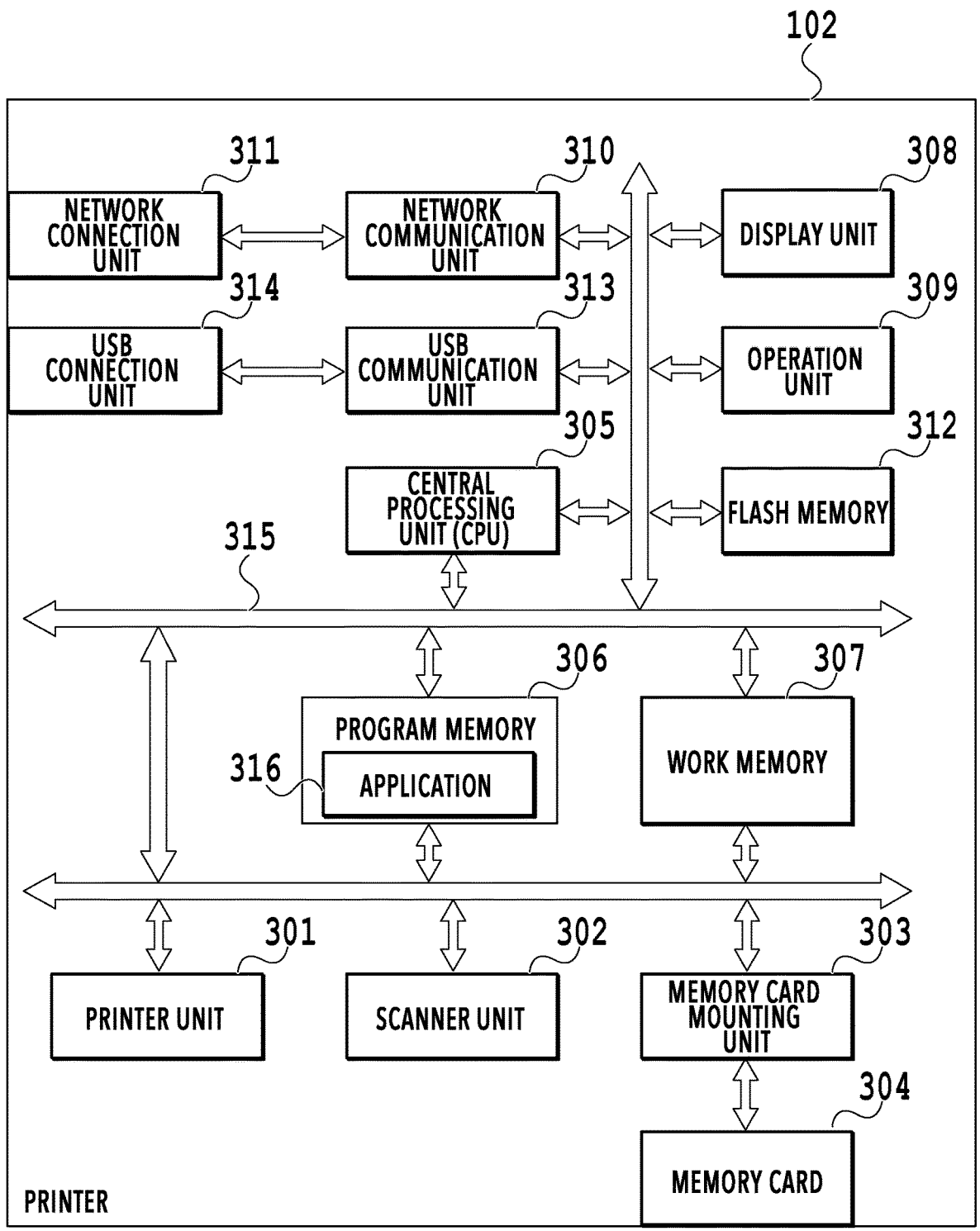
FIG. 3 is a block diagram illustrating an example of a hardware configuration of a printer.

FIG. 3 is a diagram illustrating an example of the hardware configuration of the printer 102. The printer 102 includes a printer unit 301, a scanner unit 302, a memory card mounting unit 303, and a memory card 304. Further, the printer 102 includes a CPU 305, a program memory 306, a work memory 307, a display unit 308, an operation unit 309, a network communication unit 310, a network connection unit 311, a flash memory 312, a USB communication unit 313, and a USB connection unit 314. Although the printer 102, which is a multifunctional peripheral, is taken as an example of the image processing apparatus in the explanation of the present embodiment, the image processing apparatus may be a copy machine, a facsimile, or the like. Furthermore, the image processing apparatus may be a printer without a scanner function as well. In the printer 102, the print function is implemented by the printer unit 301; the scanner function is implemented by the scanner unit 302; and the storage function is implemented by the memory card mounting unit 303 and the memory card 304. The printer unit 301 prints image data received from the outside, image data stored in the memory card 304, or the like, on a print sheet by a recording system such as an ink jet system or an electrophotographic system. Further, the printer unit 301 also manages ink information including the ink remaining amount and sheet information including the number of loaded sheets.

The scanner unit 302 optically reads a document set on a platen (not illustrated in FIG. 3) and converts the document into digital data. Further, the scanner unit 302 transmits image data, which is converted into a designated file format, to an external apparatus via a network or stores the image data in a storage area (not illustrated in FIG. 3) such as an HDD. Further, in order to implement copying, the scanner unit 302 reads a document placed on the platen to generate image data and transfers the image data to the printer unit 301, and the printer unit 301 prints the image data on a print sheet. The memory card 304 mounted in the memory card mounting unit 303 stores various kinds of file data. The various kinds of file data can be read out and edited by use of an external apparatus via a network. Further, it is also possible to store file data in the memory card 304 by use of an external apparatus.

The CPU 305 is a central processing unit for controlling each unit in the printer 102. The program memory 306 is configured with a ROM or the like and stores various program codes and an application 316 for communicating with a server apparatus. Further, the application 316 accesses the printer unit 301 to obtain consumables information about ink, sheets, etc. The work memory 307 is configured with a RAM or the like and temporarily stores or buffers image data, a job log, etc., for executing each service. The display unit 308 is configured with an LCD, for example, and displays various kinds of information. The operation unit 309 includes a switch, etc., for a user to perform various kinds of input operations. The network communication unit 310 is connected to the router 105 via the network connection unit 311. That is, the network communication unit 310 is connected to a network such as the Internet 100 via the network connection unit 311 to perform various kinds of communications. For each communication, control through HTTP, XMPP, etc., is performed. Note that, as for the protocol, another protocol may be used. The network communication unit 310 corresponds to a wired LAN or a wireless LAN. In a case where the network communication unit 310 corresponds to a wired LAN, the network connection unit 311 is a connector for connecting a cable of a wired LAN, and, in a case where the network communication unit 310 corresponds to a wireless LAN, the network connection unit 311 is an antenna. The flash memory 312 is a non-volatile memory for storing image data, etc., received by the network communication unit 310. The USB communication unit 313 is connected to various kinds of peripheral apparatuses (e.g., the computer 101) via the USB connection unit 314 to perform various kinds of communications. The above-described units are mutually connected by a bus 315.

<Hardware Configuration of Servers>

Figure 4:
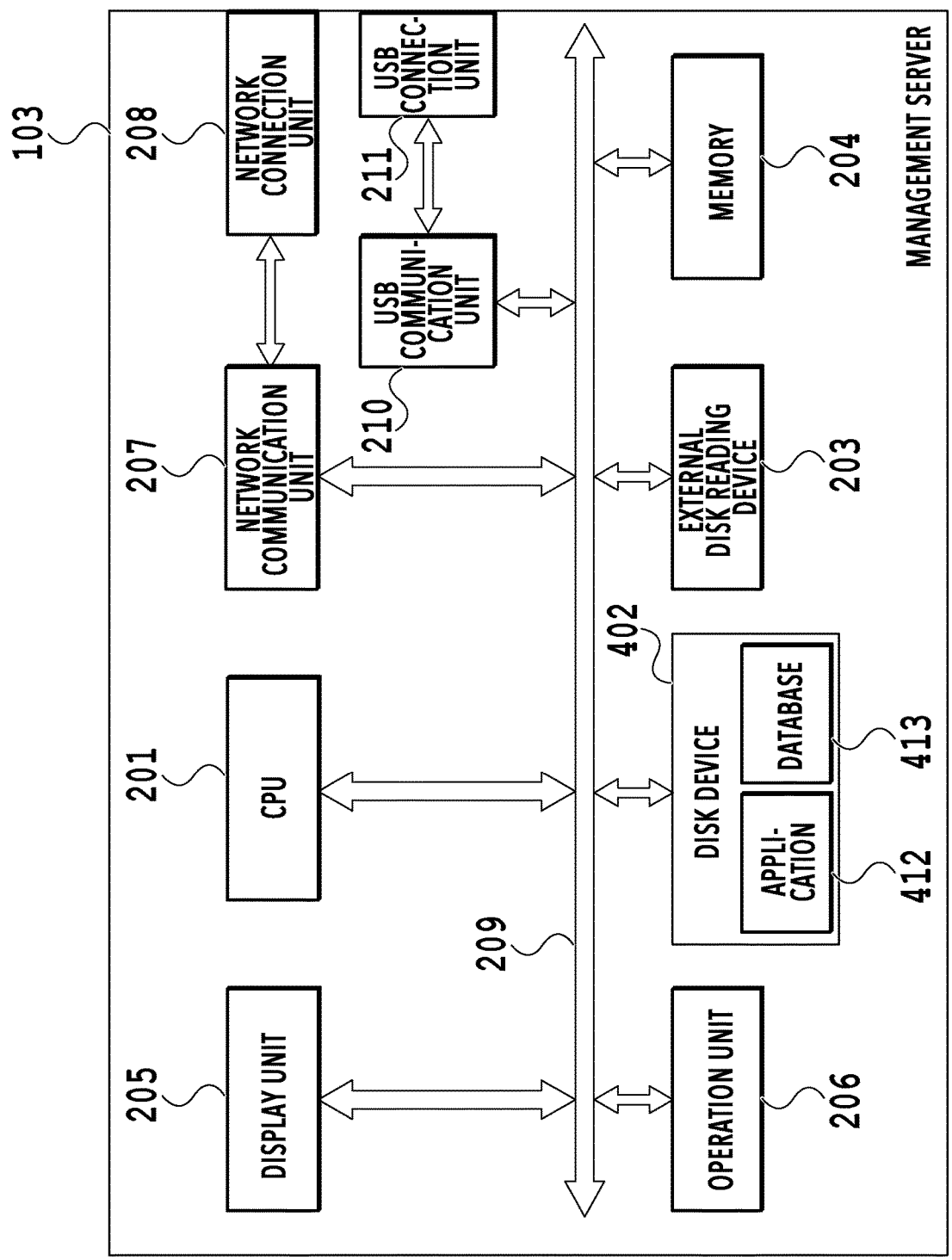
FIG. 4 is a block diagram illustrating an example of a hardware configuration of a server.

FIG. 4 is a block diagram illustrating the hardware configuration of the management server 103. The service provider server 104 has the same hardware configuration. Note that the same signs are attached to the same configurations of the computer 101 illustrated in FIG. 2 to omit the explanation thereof. The disk device 402 of each of the management server 103 and the service provider server 104 stores various kinds of files in addition to an OS, a database 413, and an application 412 to be read out by the CPU 201.

<Sequence>

Next, an explanation is given of processing from service registration for a web service to start of utilization of the web service by use of a registration application, which is one of the applications 212 stored in the disk device 202 of the computer 101.

Figure 5:
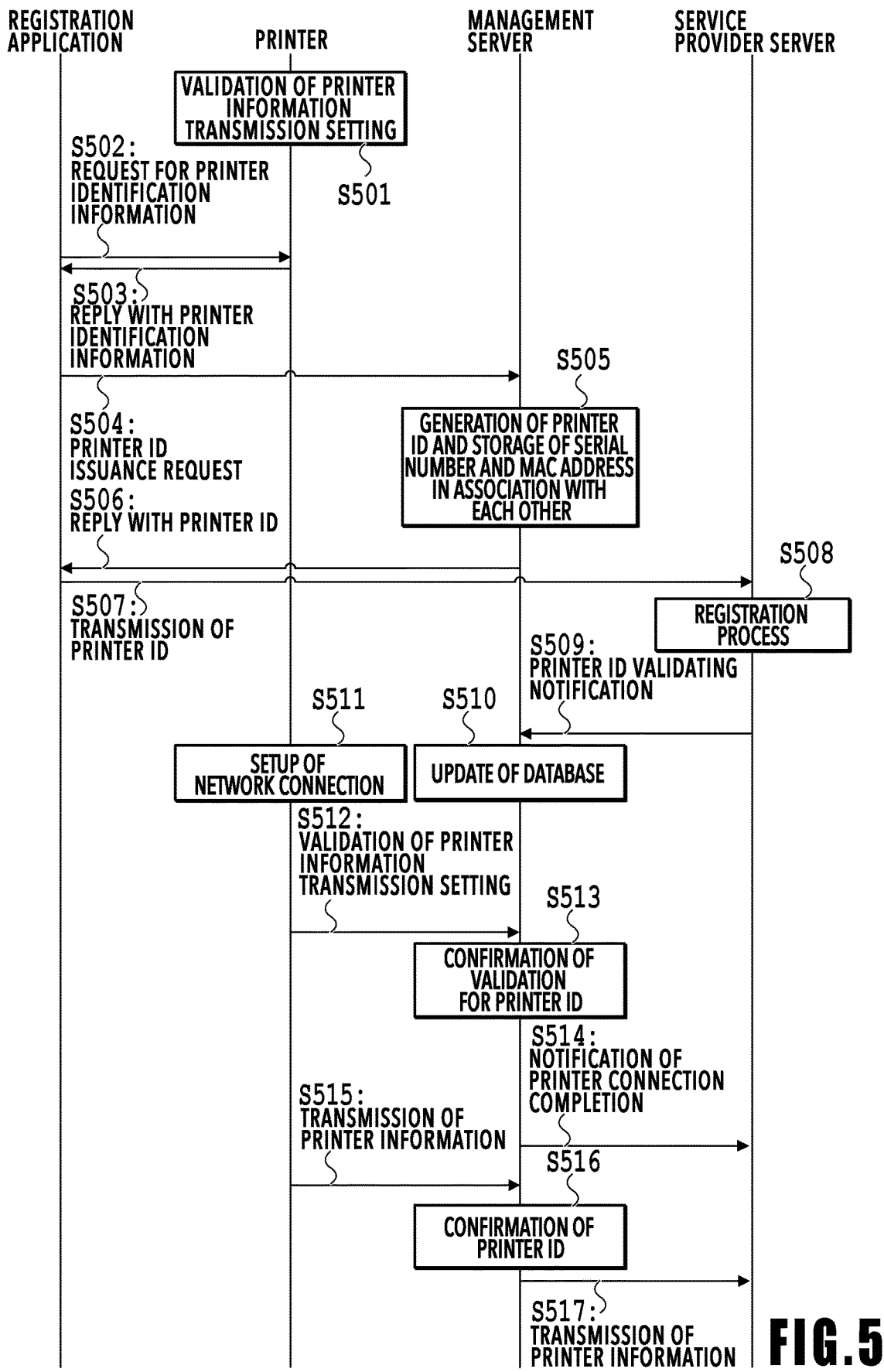
FIG. 5 is a sequence diagram related to service registration processing and information transmission.

FIG. 5 is a sequence diagram illustrating an example of processing from service registration for a web service to start of utilization of the web service by use of a registration application. In FIG. 5, the computer 101 is connected to the printer 102 via the USB cable 106 and is capable of communicating with the printer 102. Further, it is assumed that the printer 102 is connected to the computer 101 via the USB cable 106 but is not connected to the Internet via the router 105. That is, an explanation is given of processing in which service registration for a web service is performed in a state where the printer 102 is not connected to a network such as the Internet 100.

The series of processing illustrated in the sequence of FIG. 5 is performed by the CPUs of the computer 101, the printer 102, the management server 103, and the service provider server 104 retrieving program codes stored in the disk devices, etc., into the RAMs and executing the program codes. Alternatively, a part or all of the functions in the steps of FIG. 5 may be implemented by hardware such as an ASIC or an electronic circuit. Note that the symbol "S" in the explanation of each process means that it is a step in the flowchart.

In S501, the printer 102 detects that the user has validated a printer information transmission setting through the operation unit 309. The printer information transmission setting is a setting for regularly or irregularly transmitting printer information, such as ink remaining amount information, from the printer 102 to the outside. Printer information is a kind of status information, which is indicative of a status of a device such as the printer 102. In the present embodiment, it is assumed that printer information is used as status information. At the point of S501, since the printer 102 is not connected to the Internet, processing triggered by validation of the printer information transmission setting is not performed.

In S502, the registration application communicates with the printer 102 via the USB cable 106 and requests the printer 102 to transmit printer identification information (also referred as first identification information) that inherently identifies the printer 102. For example, the registration application requests for the serial number and the MAC address of the printer 102 as printer identification information.

In S503, the printer 102 replies with the printer identification information to the registration application via the USB cable 106 in response to the request in S502. Note that, although it is assumed that the printer identification information is both the serial number and the MAC address of the printer 102 in the example of FIG. 5, the printer identification information may be only either one of the serial number and the MAC address of the printer 102. Further, the printer identification information may be another information as long as it is possible to identify the printer 102 with the information.

Figure 6:
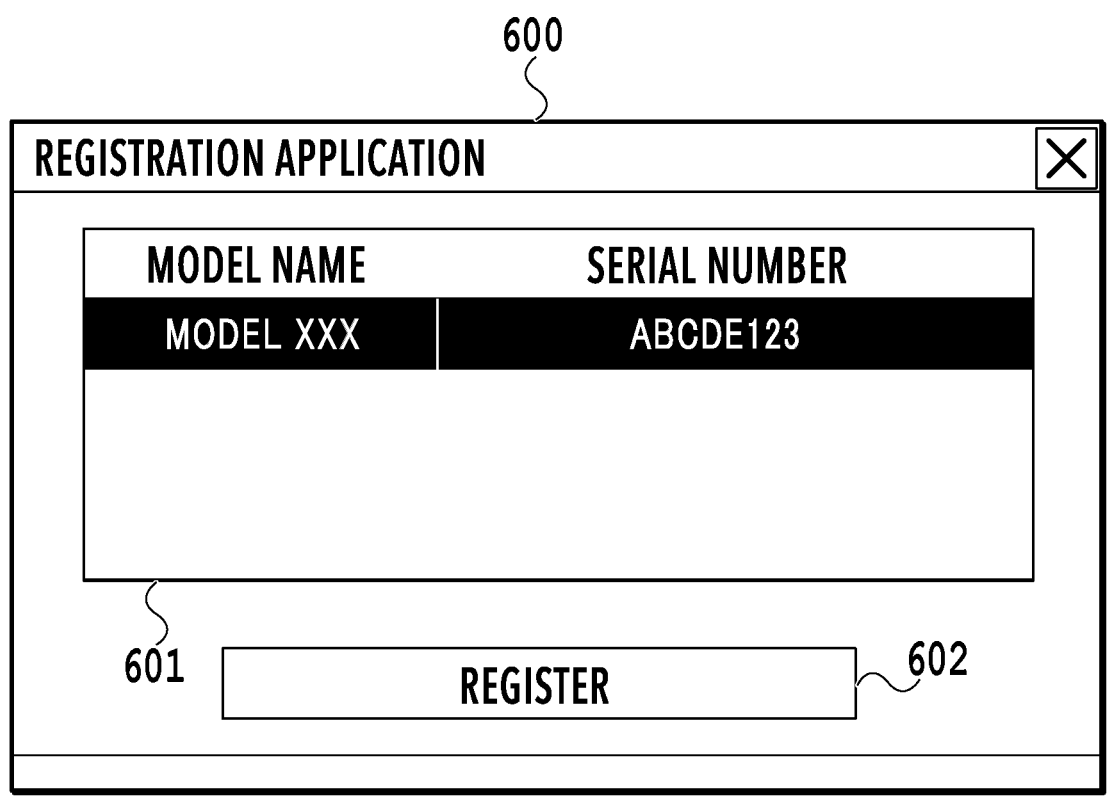
FIG. 6 is a schematic diagram of a user interface of a registration application.

FIG. 6 is a diagram schematically illustrating a user interface of the registration application. In a case where the registration application is launched by an operation from the user, the registration application displays the UI 600. Further, in a case where the registration application is launched, the registration application searches for printers connected to the computer 101 via the USB cable 106 or printers present on the same network and displays a list of printers on a list display unit 601 in the order found. Although FIG. 6 illustrates an example in which one printer 102 "MODEL XXX" is found, the model name and the serial number are written together so that, in a case where multiple printers of the same model are found, it is possible for the user to select a printer to be registered. For the serial number, it is possible to use information replied in response to the request of S502. In a case where the item "MODEL XXX", which is indicative of the printer 102 that the user would like to register, is selected by the user from among the printers displayed in the list on the list display unit 601 and the registration button 602 is pressed, the below-described process of S504 is performed. As described above, in a case where the registration application is launched, the processes illustrated in S502 and S503 are performed.

In S504, the registration application transmits a printer identifier (hereinafter referred as "printer ID") issuance request to the management server 103 via the Internet 100. A printer ID (also referred as second identification information) is information that uniquely identifies a printer 102 in the management server 103 and the service provider server 104. In the web service performed in the present embodiment, a printer 102 is identified by use of a printer ID for providing the web service. Note that the reason why the web service is performed by use of a printer ID (i.e., second identification information) instead of printer identification information (i.e., first identification information) is as follows. For example, the printer 102 may be given to another user. It is assumed that, after User A firstly receives provision of the web service by use of the printer 102, another user User B receives provision of the web service by use of the same printer 102. In this case, if the printer 102 is identified by printer identification information (i.e., first identification information), the same printer identification information (i.e., first identification information) would be used for the new and old users. Therefore, an appropriate service may not be provided.

For example, in order to prevent double registration of a printer, the service provider server 104 may reject registration of a printer that overlaps with a registered printer. In this case, if the printer is identified by printer identification information (i.e., first identification information) in the service provider server 104, the printer identification information does not change even though the printer has been given to another user. Therefore, in a case where the above-mentioned User B, to whom the printer has been given, performs registration of the printer, the service provider server 104 may reject the registration due to double registration since the printer has already been registered by User A, who has given the printer to User B.

Therefore, in the present embodiment, even for the same printer identification information (i.e., first identification information), the management server 103 issues a different printer ID (i.e., second identification information) each time issuance of a printer ID is requested. Further, the management server 103 performs processing to invalidate a previous printer ID. Further, the service provider server 104 identifies a printer 102 by use of a printer ID. That is, in the service provider server 104, even the same printer is actually managed as different printers. Therefore, it is possible to prevent the service provider server 104 from rejecting registration of a printer that has given to another user due to double registration. Further, since a previous printer ID is invalidated by the management server 103, it is possible to prevent the service provider server 104 from unnecessarily providing a service to a previous user. That is, the entire system can prevent double registration as a result.

In S504, a request for issuing such a printer ID as above is performed. The registration application notifies the management server 103 of the printer identification information of the printer 102 and requests for issuing a printer ID.

In S505, the management server 103 issues a printer ID, which is a unique value for uniquely identifying a printer in the information processing system, in response to the printer ID issuance request by the registration application. Then, the issued printer ID is stored in the management server 103 in association with the printer identification information (i.e., serial number and MAC address). Note that, in a case where a printer ID has already been issued for the same printer identification information, a newly issued printer ID may be separately stored or may be overwritten onto the existing printer ID.

FIGS. 7A and 7B are diagrams illustrating examples of a printer management table 700 of the database 413 of the management server 103. The management server 103 associates the issued printer ID with the printer identification information included in the printer ID issuance request from the registration application and registers the issued printer ID and the printer identification information in the printer management table 700. That is, the printer ID, the serial number, and the MAC address are associated with each other and registered in the printer management table 700. Further, the printer information transmission setting is also associated in the printer management table 700. The printer information transmission setting is information indicating whether the printer 102 transmits status information, such as the remaining amounts of consumables for the printer 102, a print history, or printer information, to the management server 103 or not. As a default value, the printer information transmission setting in the printer management table 700 is registered with a value indicative of being invalid, as illustrated in FIG. 7A. As described later, the printer information transmission setting is changed based on information transmitted from the printer 102. Returning back to FIG. 5, the explanation of the sequence is continued.

In S506, the management server 103 replies with (i.e., transmits) the printer ID to the registration application. In S507, the registration application, which is replied with the printer ID, designates a URL of a web service registration page to a web browser and opens the web service registration page. Note that the web service registration page is a web page provided by the service provider server 104, and the URL of the web service registration page is preliminarily managed by the registration application. In addition, the registration application also provides the printer name of the printer 102 and the printer ID obtained from the management server 103 to the web browser and causes the web browser to transmit the printer name and the printer ID to the service provider server 104 via the Internet 100.

FIG. 8 is a diagram schematically illustrating a web service registration page displayed by the registration application on the web browser 801 of the computer 101. The registration page 802 includes a name entry field 803, a mail address entry field 804, a password entry field 805, a registration target printer display field 806, a utilization permission agreement check box 807, and a registration button 808. Note that, in the registration target printer display field 806, the printer name received by the web browser 801 from the registration application is displayed. The user enters a name, a mail address, and a password, then places a check in the utilization permission agreement check box 807, and then presses the registration button 808. In response, the web browser 801 transmits a printer ID and a printer name to the service provider server 104. Then, the service provider server 104 requests the management server 103 to validate the printer ID received from the registration application. Returning back to FIG. 5, the explanation of the sequence is continued.

In S508, the service provider server 104 detects that the user has entered user information such as a user name and a mail address on the registration page 802 illustrated in FIG. 8 and pressed the registration button 808. Then, the service provider server 104 stores the user information and the print ID in association with each other. The user information registered in association with the printer ID is used for various services. In S509, the service provider server 104 transmits the printer ID, a service identifier for identifying a service, and a URL of a notification destination of printer information to the management server 103. Further, the service provider server 104 provides the management server 103 with a printer ID validating notification for validating the printer ID.

In S510, the management server 103 updates a service management table of the database 413, based on the printer ID validating notification, which is transmitted from the service provider server 104.

FIG. 9 is a diagram illustrating an example of the service management table 900 of the database 413 of the management server 103. In the service management table 900, a printer ID, a service identifier, notification information, and a printer information notification destination URL, which are stored in the database 413, are registered in association with each other. Information stored in the service management table 900 is referred to as service information. A service identifier is information that identifies a service provided by a service provider server 104. Notification information is indicative of the type of printer information to be notified to the service provider server 104. In the example of FIG. 9, information related to consumables is notified to the service provider server 104 as printer information. A printer information notification destination URL is a URL indicative of a notification destination of printer information for the service provider server 104. That is, a printer information notification destination URL is an API present on the service provider server 104 side. In S510, the management server 103 registers the printer ID, a service identifier, notification information about the type of printer information to be notified to the service provider server 104, and a notification destination URL thereof in the service management table 900 as illustrated in FIG. 9. In this way, service registration is completed. The above is an example of processing up to service registration of a web service.

Note that it is possible to create a notification destination URL by various methods. For example, the service provider server 104 may issue a unique URL to the management server 103 in S509, and the URL may be registered in the service management table 900 in S510. Alternatively, the service provider server 104 may issue a general purpose URL to the management server 103 in S509, and the management server 103 may create a unique URL by adding the printer ID to the general purpose URL.

Returning back to FIG. 5, the explanation of the sequence for utilization of a service is continued. Note that S510 and the following S511 may be separated in terms of time. The length between S510 and S511 varies depending on the timing for the user to set up the network connection of the printer 102.

In S511, the printer 102 detects that the user has set up the network connection to make the printer 102 ready to communicate with the Internet. In S512, the printer 102 transmits via the Internet 100, to the management server 103, a printer information transmission setting validating notification for validating the printer information transmission setting, together with the printer identification information (i.e., serial number and MAC address).

In S513, in response to the reception of the printer identification information in S512, the management server 103 specifies the received printer identification information from among multiple printer identification information included in the printer management table 700 of the database 413 as illustrated in FIG. 7A. Then, as illustrated in FIG. 7B, the printer information transmission setting associated with the specified printer identification information is updated to "VALID". Furthermore, the management server 103 confirms, from the printer management table 700 of the database 413, the printer ID associated with the printer identification information received in S512. Then, in S514, the management server 103 refers to the service management table 900 and obtains the printer information notification destination URL for the service provider server 104, which is associated with the printer ID. Further, the management server 103 transmits a request to the obtained printer information notification destination URL to notify that the printer information transmission setting of the printer 102 has become valid and has been in a service start state.

In S515, the printer 102 transmits the printer identification information and the printer information, such as a status of the printer 102 and the remaining amounts of consumables, to the management server 103 via the Internet 100. In S516, the management server 103 searches the printer management table 700 of the database 413 with the printer identification information (e.g., serial number) included in the received printer information to confirm the printer ID. In S517, the management server 103 searches the service management table 900 for the printer ID confirmed in S516 and then confirms the service information associated with the printer ID. Specifically, the management server 103 confirms, from the service information, the notification information about the type of printer information to be notified to the service provider server 104 and the notification destination URL thereof. Further, the management server 103 transmits consumables information, which is included in the printer information received in S515.

The service provider server 104 stores the consumables information transmitted in S517 separately for each printer ID corresponding to a notification destination URL. Then, the service provider server 104 provides various services by use of the consumables information, the printer ID, and the user information stored in association with the printer ID in S508. For example, the service provider server 104 registers a printer ID and a mail address entered on the screen illustrated in FIG. 8 in association with each other. Then, for example, in a case where consumables information corresponding to the printer ID is indicative of a shortage of consumables (e.g., ink, toner, sheets, etc.), the service provider server 104 transmits a predetermined notification by e-mail to the mail address corresponding to the printer ID. For example, a notification of the shortage of the consumables, a notification of the URL from which the consumables can be purchased, or the like, is transmitted by e-mail. In addition, the service provider server 104 may perform processing for automatically ordering the consumables. Alternatively, the service provider server 104 may implement a service of providing the consumables. In this case, by letting the user enter an address on the screen illustrated in FIG. 8, in a case where the consumables information is indicative of a shortage of consumables, the service provider server 104 may perform processing of delivering the consumables to the address.

<Flowchart Up to Service Start State Notification by Management Server>

FIG. 10 is a flowchart up to a service start state notification by the management server 103. In FIG. 10, it is assumed that the registration application on the computer 101 has obtained a printer ID and has transmitted the printer ID to the service provider server 104. That is, it is assumed that the registration application has completed processing up to S507 of FIG. 5. In addition, the processing of FIG. 10 is performed each time the management server 103 receives a notification.

In S1001, the management server 103 receives a notification from the printer 102 or the service provider server 104. In S1002, the management server 103 determines whether the notification received in S1001 is a printer ID validating notification from the service provider server 104. In a case of a printer ID validating notification, the processing proceeds to S1003, and otherwise, the processing proceeds to S1005.

In S1003, the management server 103 registers a printer ID, a service identifier, the type of printer information, and a printer information notification destination URL included in the notification received in S1001 in the service management table 900 of the database 413. In S1004, the management server 103 searches the printer management table 700 of the database 413 for the printer ID included in the notification received in S1001 and confirms the state of the printer information transmission setting. In a case where the state of the printer information transmission setting is the "VALID" state, the processing proceeds to S1008, and, in a case of "INVALID" or in a case where data corresponding to the printer ID is not present in the printer management table 700, the processing is terminated. That is, in a case where the network connection setup as illustrated in S511 has been completed for the printer 102 and the state of the printer information transmission setting is "VALID", the processing proceeds to S1008.

An explanation is given of a case where the printer information transmission setting is determined to be "INVALID" in S1004 and a case where the printer information transmission setting is determined to be "VALID" in S1004. In FIG. 5, when the management server 103 receives the printer ID validating notification in S509, the validation processing for the printer ID in S513 has not been executed. Therefore, in the example of FIG. 5, the printer information transmission setting is determined to be "INVALID" in S1004. However, the network connection setup in S511 and the registration process in S508 are independent processes, and therefore, unlike the example of FIG. 5, the network connection setup in S511 may be performed earlier than the registration process in S508. For example, after the transmission of the printer ID in S506, the network connection setup may be performed for the printer 102 while the screen illustrated in FIG. 8 is displayed by the registration application. In this case, in the management server 103, validation of the printer information transmission setting is requested in S512 and the printer information transmission setting is validated in S513 before the printer ID validating notification is received in S509. In this case, in S1004, the printer information transmission setting is determined to be "VALID".

In a case where the determination result in S1002 is not a printer ID validating notification, the management server 103 determines, in S1005, whether the notification received in S1001 is a printer information transmission setting validating notification, which is transmitted together with printer identification information from the printer 102. In a case of a printer information transmission setting validating notification, the processing proceeds to S1006, and otherwise, the processing is terminated. Note that, although the printer identification information in the above processing is the serial number of the printer 102, the printer identification information may be the MAC address or both of the serial number and the MAC address. In S1006, the management server 103 searches the printer management table 700 of the database 413 with the serial number received in S1005 and updates the state of the printer information transmission setting of the corresponding printer 102 to "VALID". Note that, in S1004 as described above, in a case where the process of S1006 has already been executed for the printer ID, the processing proceeds to S1008 after the process of S1006.

In S1007, the management server 103 confirms the printer ID associated with the serial number received in S1005 from the printer management table 700 of the database 413. Then, the management server 103 searches the service management table 900 of the database 413 for the confirmed printer ID. Further, in a case where the data is present, the processing proceeds to S1008, and, in a case where the data is not present, the processing is terminated. That is, it is determined whether the printer 102, which is the transmission source that has transmitted the printer information transmission setting validating notification, is a printer that has already been in a service start state. In a case of a printer that has already been in a service start state, the processing proceeds to S1008. In a case where the process of S1003 as described above has been executed for the printer ID, the process of S1008 is executed as a result of the determination in S1007.

Then, in S1008, the management server 103 notifies the service provider server 104 that the printer 102 has been in the service start state. That is, in a case where conditions that the printer information transmission setting is "VALID" and that the registration in the service management table 900 is completed, the management server 103 issues a printer connection completion notification to the service provider server 104.

<Flowchart of Printer Information Transmission Processing by Management Server>

FIG. 11 is a flowchart of processing in which the management server 103 transmits printer information to the service provider server 104. In S1101, the management server 103 receives printer information from the printer 102. Printer information includes: printer identification information such as a serial number or a MAC address; a printer status; the model numbers of consumables; consumables information such as the remaining ink amount; or print job information such as the number of sheets to be printed, the sheet type, or the sheet size, in the example of the description in FIG. 11.

In S1102, the management server 103 confirms whether the type of printer information received in S1101 is consumables information or print job information. In S1103, the management server 103 searches the printer management table 700 of the database 413 for the serial number or the MAC address received in S1101. Then, the management server 103 confirms whether there is a printer ID associated with the serial number or the MAC address. In a case where there is a printer ID associated with the serial number or the MAC address, the processing proceeds to S1104. In a case where there is not a printer ID associated with the serial number or the MAC address, the processing is terminated.

In S1104, the management server 103 searches the service management table 900 of the database 413 for the printer ID confirmed in S1103 and confirms the notification destination URL and the type of the printer information to be notified to the service provider server 104. In a case where the type of printer information to be notified is included in the information received from the printer 102 in S1101, the processing proceeds to S1105, and otherwise, the processing is terminated. In a case where the type of printer information to be notified is "consumables information" in S1105, the processing proceeds to S1106, and otherwise, the processing proceeds to S1107. In S1106, in a case where there is an ink tank whose remaining ink amount is equal to or less than threshold value X based on the received consumables information, the processing proceeds to S1107, and otherwise, the processing is terminated. In S1107, out of the printer information received in S1101, the management server 103 transmits the information of the type of printer information, which has been confirmed in S1104, to the notification destination URL, which has been confirmed in S1104, and then terminates the processing.

As described above, according to the present embodiment, even in a case where the printer 102 cannot be connected to the Internet, it is possible to start and complete registration processing for a web service. Then, in a case where the printer 102 is connected to the Internet after the registration for a web service, the printer 102 becomes a service start state, and printer information according to the service is transmitted to the service provider server 104 via the management server 103. Such registration for a web service as above may be performed together in a flow of installing a printer driver and a printing application on the computer 101. Here, by connecting the printer 102 and the computer 101 by use of the USB cable 106, it is possible to complete registration for a web service at the time of staring installation of a printer driver or the like.

Note that, in the above-described example, by creating a unique notification destination URL for each printer ID, it is possible for the service provider server 104 to store printer information for each printer ID in a distinguishable manner. However, the method for the service provider server 104 to distinguish printer information is not limited thereto. For example, in S517, the management server 103 may access a general purpose URL for multiple printer IDs, and printer IDs may be notified to the service provider server 104 through the access.

Second Embodiment

In the first embodiment, an explanation has been given of a mode of performing registration processing for one web service. In the present embodiment, an explanation is given of processing in which the service provider server 104 provides multiple different web services, and registration for the multiple different web services is performed to make the multiple different web services in the start states at once. Note that the same signs are attached to the same configurations and processes of the first embodiment to omit the explanation thereof.

FIG. 12 is a diagram schematically illustrating a registration page for registration for multiple different web services. There are a utilization permission agreement check box 1202 for Service A and a utilization permission agreement check box 1203 for Service B, so as to apply for multiple services. The user can place checks on both of the utilization permission agreement check box 1202 for Service A and the utilization permission agreement check box 1203 for Service B and press the registration button 808. In the case where the registration button 808 is pressed with both of the utilization permission agreement check box 1202 for Service A and the utilization permission agreement check box 1203 for Service B checked, the service provider server 104 transmits respective service identifiers and URLs of notification destinations of printer information to the management server 103 and requests for validation of a printer ID received from the registration application.

FIG. 13 is a flowchart regarding the management server 103 up to registration for multiple different web services and start of utilization of the web services. The same signs are attached to the same processes of FIG. 10 to omit the explanation thereof. In S1301, the management server 103 registers, in the database 413, the respective service identifiers and URLs of notification destinations of printer information, which are received from the service provider server 104, and the types of printer information to be notified. For example, as illustrated in FIG. 14, the management server 103 registers each of the received service information in the service management table 1400 of the database 413. In S1302, the management server 103 notifies all the registered services that the printer 102 has been in a service start state.

As described above, according to the present embodiment, it is possible to register for multiple services at once by use of one printer ID. In addition, printer information to be notified can be changed for each service.

Other Embodiments

Although printer information is taken as an example of status information in the above embodiments, the present invention is not limited thereto. Status information may be information indicative of a device state of a device such as the printer 102. Further, status information may be any kinds of information as long as the status information is information according to a service provided by a service provider server 104.

Furthermore, although the management server is illustrated as one server in the above-described embodiments, the present invention is not limited thereto. The management server may be configured with multiple servers, such as a device management server that issues a printer ID and a service management server that manages storage of status information of a printer and transmission of status information of a printer to a service provider server. The number of image processing apparatuses connected to the management server may be more than one. In addition, the management server and the service provider server may be separate servers. Further, different modules in one server may function as the management server and the service provider server, respectively.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-163648, filed Aug. 31, 2018, which is hereby incorporated by reference wherein in its entirety.

What is claimed is:

1. An information processing method executed by an information processing apparatus for performing registration for a web service, the information processing apparatus communicating with an image processing apparatus and a management server configured to manage status information transmitted from the image processing apparatus through a network, the information processing method comprising:
    performing first communication with the image processing apparatus without using the network;
    obtaining first identification information from the image processing apparatus through the first communication, the first identification information identifying the image processing apparatus;
    transmitting the obtained first identification through the network;
    obtaining second identification information transmitted from the management server for responding the first identification information transmitted by the information processing apparatus through the network, the second identification information identifying the image processing apparatus; and
    transmitting a request, to a server that provides the web service, for performing registration regarding the image processing apparatus based on the second identification information.

2. The information processing method according to claim 1, wherein the network corresponds to the Internet.

3. The information processing method according to claim 1, wherein the first communication corresponds to a communication using a USB (Universal Serial Bus) cable.

4. The information processing method according to claim 1, wherein the request includes a request for registration for a plurality of web services.

5. The information processing method according to claim 1,
    wherein the image processing apparatus corresponds to a printer, and
    wherein the web service corresponds to a service related to consumables used for the printer.

6. The information processing method according to claim 1, wherein new second identification information is obtained, in a case where the first identification information is transmitted again from the information processing apparatus and the second identification information issued previously by the management server is invalidated.

7. The information processing method according to claim 1, wherein a screen for performing the registration is displayed based on the second identification information.

8. The information processing method according to claim 1, wherein the first identification information is a serial number.

9. The information processing method according to claim 1, wherein the status information is information related to consumables used by the image processing apparatus.

10. An image processing apparatus configurable for communication with a management server configured to manage status information transmitted from the image processing apparatus through a network, and with an information processing apparatus for performing registration for a web service, the image processing apparatus comprising:
one or more processors; and
one or more memories storing instructions that, when executed by the one or more processors, cause the image processing apparatus to:
perform first communication with the information processing apparatus without using the network;
transmit first identification information to the information processing apparatus through the first communication to for responding a request from the information processing apparatus through the first communication, the first identification information identifying the image processing apparatus;
perform second communication through the network;
transmit a notification together with the first identification information to the management server through the network in a case where a setting for transmitting the status information is validated and the second communication is effective, the notification indicating that the setting for transmitting the status information is validated; and
transmit the status information together with the first identification information to the management server through the network after the notification is transmitted.

11. The image processing apparatus according to claim 10,
wherein the image processing apparatus corresponds to a printer, and
wherein the web service corresponds to a service related to consumables used for the printer.

12. The image processing apparatus according to claim 10, wherein the first identification information is a serial number.

13. The image processing apparatus according to claim 10, wherein the status information is information related to consumables used by the image processing apparatus.

14. An information processing system including an image processing apparatus, a management server configured to manage status information transmitted from the image processing apparatus through a network, and an information processing apparatus for performing registration for a web service, wherein the information processing apparatus comprises:
one or more processors; and
one or more memories storing instructions that, when executed by the one or more processors, cause the information processing apparatus to:
perform first communication with the image processing apparatus without using the network;
obtain first identification information from the image processing apparatus through the first communication, the first identification information identifying the image processing apparatus;
transmit the obtained first identification through the network;
obtain second identification information transmitted from the management server for responding the first identification information transmitted by the information processing apparatus through the network, the second identification information identifying the image processing apparatus; and
transmit a request, to a server that provides the web service, for performing registration regarding the image processing apparatus based on the second identification information.

15. The information processing system according to claim 14, wherein the server that provides the web service includes:
one or more processors; and
one or more memories storing instructions that, when executed by the one or more processors in the server, cause the server to:
receive the request for service registration by use of the second identification information from the information processing apparatus; and
transmit the second identification information and service information related to the web service to the management server for responding the request for registration.

16. The information processing system according to claim 15, wherein the management server includes:
one or more processors; and
one or more memories storing instructions that, when executed by the one or more processors in the management server, cause the management server to:
manage the first identification information and the second identification information in association with each other; and
manage the second identification information and the service information in association with each other.

17. The information processing system according to claim 16, wherein the one or more memories in the management server further storing instructions that, when executed by the one or more processors in the management server, cause the management server to:
receive an identification information issuance request transmitted from the information processing apparatus together with the first identification information;
generate the second identification information for responding the identification information issuance request and manage the generated second identification information in association with the first identification information; and
reply to the identification information issuance request with the generated second identification information.

18. The information processing system according to claim 16, wherein the one or more memories in the management server further storing instructions that, when executed by the one or more processors in the management server, cause the management server to:
receive a notification from the image processing apparatus together with the first identification information, the notification indicating that a setting for transmitting the status information is validated and
notify the server that provides the web service that connection of the image processing apparatus is completed, based on the service information associated with the second identification information, in a case where the second identification associated with the first identification, with which the notification of validation is transmitted, is managed.

19. The information processing system according to claim 14, wherein new second identification information is obtained, in a case where the first identification information is transmitted again from the information processing apparatus and the second identification information issued previously by the management server is invalidated.

20. The information processing system according to claim 14, wherein a screen for performing the registration is displayed based on the second identification information.

21. The information processing system according to claim 14, wherein the first identification information is a serial number.

22. The information processing system according to claim 14, wherein the status information is information related to consumables used by the image processing apparatus.

* * * * *